United States Patent [19]

Shepherd

[11] 3,950,883

[45] Apr. 20, 1976

[54] FISHING ROD HANDLE ASSEMBLY

[75] Inventor: Bob Gene Shepherd, West Columbia, S.C.

[73] Assignee: Columbia Products Company, Columbia, S.C.

[22] Filed: May 14, 1974

[21] Appl. No.: 469,848

[52] U.S. Cl. .................................................. 43/22
[51] Int. Cl.² ......................................... A01K 87/06
[58] Field of Search ....................................... 43/22

[56] References Cited
UNITED STATES PATENTS

| | | | |
|---|---|---|---|
| 2,421,240 | 5/1947 | Camburn | 43/22 |
| 2,594,536 | 4/1952 | Beyer | 43/22 |
| 2,756,531 | 7/1956 | Hollenshead | 43/22 |
| 3,034,798 | 5/1962 | Portz | 43/22 |

Primary Examiner—Louis G. Mancene
Assistant Examiner—Peter K. Skiff
Attorney, Agent, or Firm—Hamilton, Renner & Kenner

[57] ABSTRACT

The attached disclosure is directed to a fishing rod handle assembly onto which a reel and a rod portion can be simultaneously, or individually, clamped by virtue of a combined actuating mechanism. The rod section is secured to the handle by a collet having a socket into which the butt portion of the rod section is received. The peripheral wall of the socket is selectively compressible radially inwardly against the butt portion of the rod section by a camming interaction between the collet and collet nut threadably received on the handle. A clamping pawl is pivotally attached to the rear of the collet and extends from the collet to an offset reel seat on the handle where it is adapted to embrace the toe of a reel mounting foot upon selective rotation of the collet nut. In one embodiment of the invention disclosed, the collet nut and the collet also interact to provide a positive disengagement of the clamping pawl from the reel.

8 Claims, 4 Drawing Figures

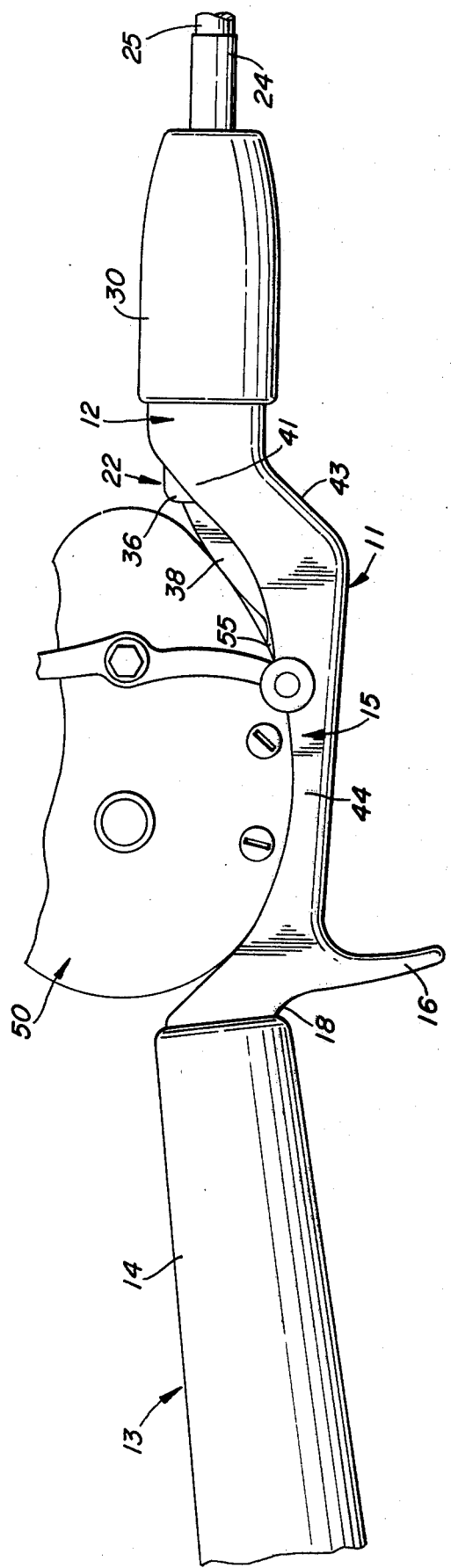
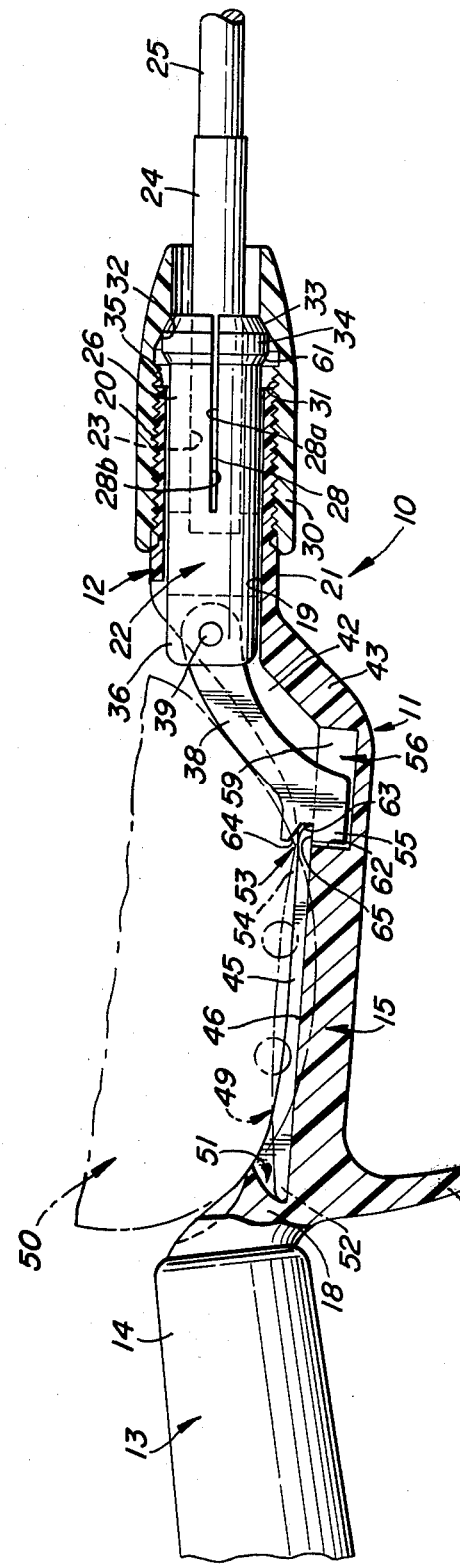

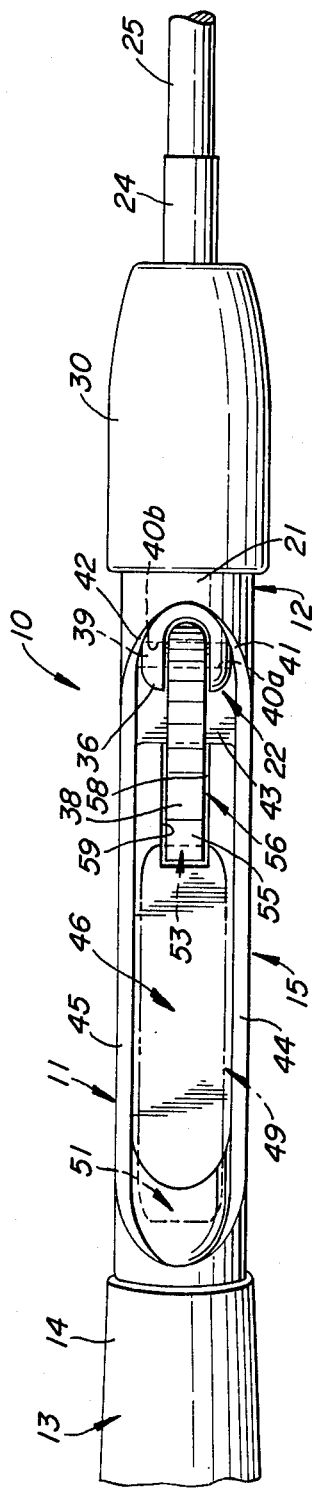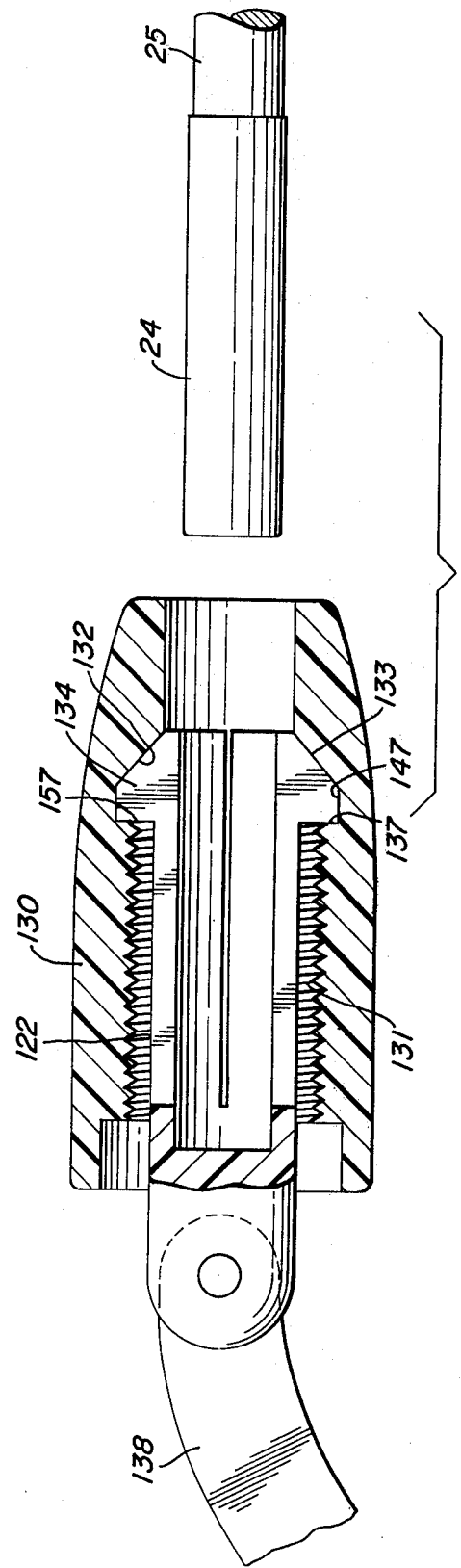

FISHING ROD HANDLE ASSEMBLY

BACKGROUND OF THE INVENTION

The present invention is directed generally to a fishing rod handle assembly and is directed specifically to an improved arrangement by which a reel and a rod section can be simultaneously or, selectively, independently secured to the handle.

It is customary to secure the reel and rod section to the handle by independent means. Most commonly, the foot of the reel is secured to the reel seat on the handle by one of a variety of clamping arrangements that are tightened and released by actuating mechanisms which quite frequently extend radially outwardly with respect to the handle to interrupt the otherwise smoothly contoured exterior surface of the handle. The configuration of such actuating mechanisms often precludes the application of sufficient torque effectively to secure or release the reel merely by the unaided fingers and inconveniently requires the use of a coin, screwdriver or the like. In addition, the numerous small clamping plates, nuts, screws or the like employed in such an arrangement are otherwise difficult to manipulate, easy to lose and unduly increase the manufacturing cost.

Similarly, it is customary to secure the rod section to the handle by an independent collet which anchors the butt portion of a rod section within a cylindrical cavity at the front of the handle by actuating means which operate wholly independently of the means to actuate the reel clamping arrangement. Inasmuch as the collet is normally freely rotatable within the cylindrical cavity, particularly close attention must be paid to insure that proper alignment of the line guides on the rod section is maintained with respect to the reel secured, or to be secured, on the handle section.

The prior art reveals a number of different arrangements by which simultaneously to secure both a rod section and a reel to a handle by a combined mechanism. The concepts most frequently heretofore employed require that a special ferrule be permanently secured to the butt portion of the rod section. In some arrangements the ferrule is threaded in order to be engaged by a locking nut mounted on the handle; the threaded engagement is generally employed to secure the rod to the handle, and as the rod is threaded into the handle, the ferrule is moved rearwardly to engage and lock against the mounting foot of the fishing reel, or the ferrule is moved rearwardly to engage an independent member which in turn engages and locks against the mounting foot of the reel.

In other known, prior art arrangements embodying a ferrule secured to the butt portion of rod section, the locking nut is retained on the rod section meshingly to engage thread means provided on the handle.

Because both of the foregoing concepts require the use of special ferrules permanently secured to the butt portion of the rod section, they require an undue duplication of parts in order to permit a variety of rod sections to be interchangeable with a single handle. In addition, the aforementioned prior art concepts do not permit the rod or reel to be independently mounted on the handle, an arrangement often highly desirable to accommodate various transportation facilities.

Only rarely have combination means for simultaneously attaching a reel and rod section to a handle been adapted to accommodate the butt portion of a rod section without the use of a special ferrule, and in those arrangements the clamping means has generally extended rearwardly from the locking collet within which the butt portion of the standard rod section is received and has been slidably received through a conforming passageway in the forward portion of the handle to exit in proximity to the reel seat. The clamping means are also normally beveled wedgingly to engage the mounting foot on the reel. The wedging interaction between the clamping means aand the mounting foot on the reel, however, not only clamps the mounting foot against the handle but also tends to bind the clamping means within the passageway, sometimes making it relatively difficult to release either the reel or the rod section.

SUMMARY OF THE INVENTION

It is, therefore, a primary object of the present invention to provide a fishing rod handle assembly that incorporates a combined mechanism for simultaneously securing a rod section and a reel to the handle.

It is another object of the present invention to provide a fishing rod handle assembly, as above, in which the combined securing mechanism permits either the rod section or the reel to be independently secured to the handle.

It is yet another object of the present invention to provide a fishing rod handle assembly, as above, which will grippingly engage the butt portion of a rod section without the necessity of having a special ferrule secured to the rod section, thus facilitating the use of interchangeable rod sections with a single handle.

It is a further object of the present invention to provide a fishing rod handle assembly, as above, having a combined securing mechanism by which the mounting foot of a fishing reel can be releasably secured to a reel seat on the handle without undue binding — which combined securing mechanism does not require any interruption to the desired contour for the exterior surface of the handle and which can be freely actuated with the unaided fingers.

It is a still further object of the present invention to provide a fishing rod handle assembly, as above, which permits a mechanical interaction between the securing mechanism and the means for actuating the securing mechanism such that the securing mechanism may be positively driven to disengage as well as to engage the rod and reel.

It is an even further object of the present invention to provide a fishing rod handle assembly, as above, that is relatively uncomplicated to manufacture and easy to maintain and operate.

These and other objects of the invention, as well as the advantages thereof over existing and prior art forms, will be apparent in view of the following detailed description of the attached drawings and are accomplished by means hereinafter described and claimed.

In general, a fishing rod handle assembly embodying the concept of the present invention has a hand-gripping portion at the rear, a tubular housing at the front and an offset reel seat located medially of the hand-gripping portion and housing portion. A cylindrical passageway extends through the housing and slidably receives a collet. The front portion of the collet presents a socket into which the butt portion of a rod section is receivable. The annular skirt portion of the collet which surrounds the socket is longitudinally slotted so that on the application of a radially inwardly directed force, the skirt will constrict around the butt portion of the rod section frictionally to secure the rod section to the handle.

The radial actuating force is applied to the skirt by a cam means presented from a collet nut threadably mounted on the housing portion of the handle. The cam means engages a follower surface on a flange means extending radially outwardly of the skirt portion. The outer diameter of the flange means is large in comparison not only to the inner diameter of the passageway through the housing portion of the handle, but also in comparison to the inner diameter of the aperture through the forward end of the collet nut. As such, the flange means retains the collet within the housing portion of the handle so long as the collet nut is mounted on the housing.

A clamping pawl is pivotally secured to the rear of the collet and extends from the collet, which is received within the housing portion of the handle, to the offset reel seat. The end of the pawl distal with respect to the collet presents a head, a portion of which is received in a longitudinally oriented guide slot in the reel seat in order to prevent rotation of the collet and thereby obviate undesirable rotation of the rod section as the collet nut is tightened.

The head on the pawl also presents a recess to engage the toe on the mounting foot of the reel, and because the head is partially received within the guide slot, the apex of the walls forming the recess may lie in proximity to the plane of the reel seat. This disposition of the recess, coupled with the ability of the pawl to swing on the collet, permits the recess to embrace the toe of the mounting foot and accommodate the individual configuration of the mounting foot on various reels, thus tending to reduce binding of the clamping mechanism as it is tightened to secure the reel to the handle. In this manner, disassembly of the reel from the handle is facilitated. If desired, an alternative construction provides a means for effecting positive disengagement upon loosening the collet nut.

Two alternative embodiments of the present invention are shown by way of example in the accompanying drawings and described in detail without attempting to show all of the various forms and modifications in which the invention might be embodied.

DESCRIPTION OF THE DRAWINGS

FIG. 1 is a side elevation of a fishing rod handle assembly embodying the concept of the present invention, the handle assembly being depicted with a rod section and a reel secured to the handle by a combined mechanism;

FIG. 2 is a view similar to FIG. 1 but with the handle assembly partly broken away in longitudinal section to reveal the combined mechanism for securing a reel and rod section to the handle in detail;

FIG. 3 is a top plan view of the handle and rod section depicted in FIG. 1 but with the reel removed; and, FIG. 4 is enlarged and partially exploded cross section similar to a portion of FIG. 2 but with the frame of the handle assembly removed to depict an alternative configuration for selected components of the combined securing mechanism.

DESCRIPTION OF THE PREFERRED EMBODIMENTS

Referring more particularly to the drawings, the embodiment of an improved fishing rod handle assembly depicted therein is indicated generally by the numeral 10. The handle assembly 10 has a frame 11 that is preferably comprised of: a housing 12 at the forward, or front, portion thereof; a hand grip 13 at the rear thereof that may be covered in a known manner by cork 14 or another material that is not only comfortable to the fisherman's hand but also not unduly slippery, even when wet; and, an intermediate, offset reel receiving portion 15. As is customary, a finger engaging spur 16 may extend downwardly from the reel receiving portion 15 in proximity to the rear transitional haunch 18 that interconnects the reel receiving portion 15 to the hand gripping portion 13.

The housing 12 at the front of the frame is, as best seen in FIG. 2, of tubular configuration with a cylindrical passageway 19 extending therethrough and with threads 20 provided on the generally cylindrical, outer surface 21.

A collet 22 slidably received within the passageway 19. The forward portion of the collet 22 has a socket 23 into which the butt portion 24 of a rod section 25 is receivable. An annular skirt portion 26 of the collet 22 forms the peripheral wall of the socket and is provided with a plurality — preferably from — diametrically opposed, axially extending slots 28 in order to permit the collet to be compressed radially inwardly into frictionally locking engagement with the butt portion 24 of the rod section 25 by means of a collet nut 30, as hereinafter more fully described.

The interior of the collet nut 30 is provided with threads 31 adapted meshingly to engage the corresponding threads 20 presented from the generally cylindrical exterior surface 21 of the housing portion 12. Forwardly of the threads 31, but still within the interior of the collet nut 30, is a conically tapered cam surface 32 that faces generally rearwardly and inwardly to engage an opposing follower surface 33 on a radially outwardly extending, annular flange 34 at the forward most terminus of the skirt 26 on collet 22.

Because the outer diameter of the flange 34 is selected to be greater than the inner diameter of the passageway 19, the rearward extent to which the collet 22 can slide within passageway 19 may be determined by engagement of the flange 34 with the stop face 35 presented by the front edge of the housing portion 12. As such, with the collet nuts 30 threadably received on the housing portion 12, the disposition of flange 34 between the cam surface 32 and the stop face 35 may be used to assure that the collet 22 is captured within the housing portion 12.

A clevis 36 is provided on the rearward extremity of the collet 22, and a clamping pawl 38 is mounted for swinging movement on the clevis pin 39. The clevis pin 39 may be conveniently retained within the opposed, registered bores 40a and 40b through clevis 36 by virtue of the laterally spaced gusset rail plates 41 and 42 that are presented from the sides of the front transitional haunch 43 that interconnects the reel receiving portion 15 to the housing portion 12. The gusset rail plates 41 and 42 lie in immediate, lateral juxtaposition to the clevis 36 and thereby serve to retain the clevis pin 39.

The gusset rail plates 41 and 42 may conveniently extend rearwardly along the reel receiving portion 15 in the form of lateral confining walls 44 and 45, respectively, on either side of the generally planar surface comprising the reel seat 46. The reel seat 46 is preferably a generally planar surface that is offset with respect to the axis 48 of the housing portion 12 to receive the mounting foot 49 of a fishing reel indicated generally by the numeral 50. The walls 44 and 45 thus provide the restraint which laterally confines the reel mounting foot 49 to the reel seat 46.

At the rear of the reel seat 46 the transitional haunch 18 presents a recess 51 within which the heel 52 of the reel mounting foot 49 may be received. Forwardly of the recess 51, and in spaced relation with respect thereto, the pawl 38 is laterally bifurcated to present an opposed notch 53 adapted to engage the toe 54 of the reel mounting foot 49.

The laterally oriented notch 53 is presented from the head 55 of the pawl 38, and a portion of the head 55 is adapted to be received within a guide slot 56 extending longitudinally of the reel seat 46. With the head 55 slidably received within the slot 56 the collet 22 cannot rotate because of the engagement of the head 55 with the side walls 58 and 59 of the slot 56.

To mount a rod section 25 and a reel 50 on the improved handle 10, the fisherman will loosen the collet nut 30 sufficiently to permit the pawl 38 to be moved an adequate distance forwardly to permit insertion of the heel 52 on the reel mounting foot 49 within the recess 51 at the rear of the reel seat 46 and position the reel mounting foot 49 along the seat 46 between the confining side walls 44 and 45. As the butt portion 24 of the rod section 25 is inserted within the socket 23 presented by collet 22, the collet 22 and pawl 38 will move rearwardly to bring the notch 53 into engagement with the toe 54 of the mounting foot 49. With the rod section, reel and handle thus loosely assembled, the fisherman will properly align the line guides on the rod section 25 with the reel 50 and then rotate the collet nut 30 on threads 20 to move it rearwardly along the housing portion 12 of the handle 10. Because the head portion 55 of the pawl 38 is received within the guide slot 56 in the reel seat 46, the tightening rotation of the collet nut 30 will not turn the collet 22 itself and will not, therefore, tend to misalign the line guides from the position selected by the fisherman.

As the collet nut 30 is tightened, the cam surface 32 moves against the follower surface 33 presented from the flange 34 on collet 22. The engagement of the follower surface 33 with the conical cam 32 imparts both a radial and an axial force component to the skirt portion 26 of the collet 22. The radial component compresses the skirt portion 26 grippingly against the butt portion 24 of the rod secton 25, and the axial component tends to move the collet 22 rearwardly within the passageway 19 through the housing portion 12 of the handle 10, thereby forcing the recess 53 against the toe 54 of the reel mounting foot 49. Tightening the collet nut 30 thus secures both the rod section 25 and the reel 50 to the handle assembly 10. Conversely, loosening the collet nut 30 permits the rod section and reel to be selectively removed from the handle.

A rod section or a reel may also be independently secured to handle embodying the concept of the present invention. For example, to secure the rod section 25 to the handle 10 without the reel 50 the action of the axial force component applied to the collet 22 by tightening the collet nut 30 will not be balanced by the reaction effected as the reel mounting foot 49 is clamped between the opposed notches 51 and 53. As such, the handle 10 may be constructed so that without a reel mounting foot 49 on the reel seat 46 rearward motion of the collet will be limited either by engagement of the rear face 61 on the flange 34 with stop face 35 at the forward extremity of the housing 12 or by engagement of the head portion 55 on pawl 38 with the rearmost and wall 62 of the slot 56. In either event, the resulting restriction on the rearward movement of the collet 22 permits continued tightening of the collet nut 30 to impart the clamping action to the rod section 25 by virture of the radially inwardly directed force component applied to the skirt 26 by the conical, cam surface 32.

To secure a reel 50 to handle 10 without the rod section 25, the action of the radial force component applied to the skirt 26 by tightening the collet nut 30 will not be balanced by the reaction affected as the skirt 26 is radially compressed against the butt portion 24 of the rod section 25. As such, the collet 22 is preferably constructed so that the compressibility of the skirt 26 is limited. The preferred manner of accomplishing this objective is to employ only four slots 28 and have the distance between the opposed walls 28a and 28b of each slot 28 be of relatively small dimension so that after a predetermined degree of compression the skirt will assume circumferential integrity and exhibit sufficient compressive hoop strength so that continued tightening of the collet nut 30 will impart an axial force component to the collet 22 sufficient to effect the required clamping of the reel mounting foot 49 between the notches 51 and 53. For example, it has been found that if four slots 28 — being circumferentially spaced at approximately 90° and each said slot having a span (measured along the circumference of the collet) of approximately one-sixteenth of an inch — are provided in a collet 22 having a socket 23 measuring five-sixteenths of an inch in diameter, the diameter of the socket will reduce only about eighty-one thousandths of an inch before circumferential integrity is restored.

It should be appreciated that the provision of the flange 34 around the periphery of the skirt 26 enhances the hoop strength required to effect the desired result because the cross sectional area of the flange 34, when the slot 28 extends entirely therethrough, compounds the bearing surface area available as the skirt assumes its circumferential integrity. Without the increased area provided by the cross section of the flange 34 it might be relatively easy for the skirt to buckle or for the opposed walls 28a and 28b merely to slide past each other, thus destroying the hoop strength required to mount a reel 50 on the handle without the rod section 25.

Most prior art handle constructions secure the reel to the reel seat by employing a clamping member that moves over the surface of the reel seat to wedge against the mounting foot on the reel. Such arrangements are particularly conducive to binding and thus often tend to make the subsequent removal of the reel most difficult. By having the entire recess 53 within the head 55, by permitting the apex 63 at which the converging upper and lower walls 64 and 65, respectively, of the notch 53 meet lie within the plane of the reel seat 46 and by having the pawl adapted to swing on clevis pin 39 so that the recess may position itself to embrace the toe on a mounting foot irrespective of its particular configuration, the tendency to bind is greatly reduced. As anyone who has had the clamping means for the reel foot bind will appreciate, it is generally an extremely difficult procedure to loosen the reel when the clamping means has bound, primarily because of the general inaccessibility of the clamp when the reel is mounted on the handle. An alternative form of the present invention provides a positive means by which to disengage the clamping pawl 38 from the reel 50.

As best seen in FIG. 4, the modified collet 122 presents a flange 134 having an inclined first follower surface 133 corresponding to the follower surface 33 on collet 10 depicted in FIG. 2, and also an oppositely directed, radially extending, second follower surface 137.

The collet nut 130 is also provided with threads 131 on the interior thereof adapted to mate with the threads 20 presented from the cylindrical exterior surface 21 of the housing portion 12 (not depicted in FIG. 4).

Forwardly of the threads 131, but still within the interior of the collet nut 130, is an annular groove 147. The forward wall of groove 147 comprises a conically tapered cam surface 132 that faces generally rearwardly and inwardly, and the rearward wall of groove 147 comprises a radially disposed second cam surface 157 that faces forwardly. The flange 134 is adapted to be received within the groove 147 so that the first cam surface 132 will engage the first follower surface 133 to effect the clamping action by which the reel and/or the rod section is secured to the handle by tightening the collet nut 130, as previously explained in conjunction with the operation of collet nut 30 on handle 10.

When the collet nut 130 is rotated to move forwardly along the housing 12 (as depicted in FIG. 2) — i.e., when the collet nut 130 is loosened — the second cam surface 157 will engage the second follower surface 137 so that continued rotation of the collet nut 130 will apply an axially forwardly directed force. The axially forwardly directed force will drive the collet 122 forwardly to release the clamping pawl 138.

It should now be apparent that a fishing rod handle assembly embodying the novel concept hereinbefore described incorporates a new and useful mechanism by which a rod section and a reel may be simultaneously and/or individually secured to the handle assembly and otherwise accomplishes the objects of the invention.

What is claimed is:

1. A fishing rod handle assembly comprising: a frame, a reel seat extending longitudinally along a portion of said frame, a tubular housing presented by said frame forwardly of said reel seat, a passageway extending through said housing, said passageway opening rearwardly toward said reel seat and opening forwardly through an annular stop face, a collet slidably received within said passageway, a rod receiving socket provided in the forward portion of said collet, a reel clamping pawl means connected to an extending rearwardly from said collet and outwardly of said housing to terminate along the longitudinal extent of said reel seat, said clamping pawl means being bifurcated to present a recess for receiving the mounting foot of a fishing reel, a guide slot in said reel seat, said guide slot extending longitudinally rearwardly from said housing, at least a portion of said pawl means being slidably received within said slot, flange means extending radially outwardly from the forward portion of said collet, means presented from said frame to limit the rearward extent to which said collet is slidable within said passageway, the forward portion of said collet being longitudinally slotted to permit radially inwardly directed compressibility thereof, external thread means on said housing, a collet nut, internal thread means on said collet nut meshing with the external thread means on said housing, a cam means presented from said collet nut, said flange means being positioned between the cam means on said collet nut and the stop face on said housing, said cam means engaging said flange means upon selective rotation of said collet nut to effect translation of said collet rearwardly and to effect compression of the slotted end portion of said collet radially inwardly.

2. A fishing rod handle assembly, as set forth in claim 1, in which said cam means presents first and second cam surfaces, said first cam surface engaging said flange means upon selective rotation of said collet nut to translate said collet rearwardly, and said second cam surface engaging said flange means upon selective counterrotation of said collet nut to translate said collet forwardly.

3. A fishing rod handle assembly, as set forth in claim 1, in which the recess presented from said pawl means is delineated by generally converging upper and lower surfaces, embracingly to engage a reel mounting foot at the level on which it is presented by said reel seat.

4. A fishing rod handle assembly, as set forth in claim 1, in which a forwardly facing terminating means is provided transversely of said guide slot, said pawl means engaging said terminating means to define a predetermined rearward extent to which said collet can be translated independently of having said recess engage the mounting foot of a fishing reel.

5. A fishing rod handle assembly comprising: a frame, a reel seat extending longitudinally along a portion of said frame, a tubular housing presented by said frame forwardly of said reel seat, a passageway extending through said housing, said reel seat being laterally offset with respect to the passageway through said housing, said passageway opening rearwardly toward said reel seat and opening forwardly through an annular stop face, a collet slidably received within said passageway, a rod receiving socket provided in the forward portion of said collet, a reel clamping pawl means being pivotally secured to said collet and extending rearwardly from said collet and outwardly of said housing to terminate along the longitudinal extent of said reel seat, flange means extending radially outwardly from the forward portion of said collet, means presented from said frame to limit the rearward extent to which said collet is slidable within said passageway, the forward portion of said collet being longitudinally slotted to permit radially inwardly directed compressibility thereof, external thread means on said housing, a collet nut, internal thread means on said collet nut meshing with the external thread means on said housing, a cam means presented from said collet nut, said flange means being positioned between the cam means on said collet nut and the stop face on said housing, said cam means engaging said flange means upon selective rotation of said collet nut to effect translation of said collet rearwardly and to effect compression of the slotted end portion of said collet radially inwardly.

6. A fishing rod handle assembly, as set forth in claim 5, in which the pawl means is keyed to said frame to prevent rotation of said collet within said housing.

7. A fishing rod handle assembly, as set forth in claim 5, in which a slot in said reel seat extends longitudinally rearwardly from said housing and at least a portion of said pawl means is slidably received within said slot to prevent rotation of said collet within said housing.

8. A fishing rod handle assembly, as set forth in claim 7, in which the recess presented from said pawl means is delineated by generally converging upper and lower surfaces, the pivotal mounting of said pawl means on said collet and the disposition of at least a portion of said pawl means within said guide slot permitting said recess embracingly to engage a reel mounting foot at the level on which it is presented by said reel seat.

* * * * *